US008643818B2

(12) United States Patent
Chiu et al.

(10) Patent No.: US 8,643,818 B2
(45) Date of Patent: Feb. 4, 2014

(54) PROTECTION STRUCTURE

(75) Inventors: Lin-Wei Chiu, Hsin-Chu (TW);
Cheng-Min Tsai, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 455 days.

(21) Appl. No.: 13/010,109

(22) Filed: Jan. 20, 2011

(65) Prior Publication Data

US 2012/0038846 A1    Feb. 16, 2012

(30) Foreign Application Priority Data

Aug. 12, 2010  (TW) .................. 99126960 A

(51) Int. Cl.
*G02F 1/1333*    (2006.01)
*G02F 1/1345*    (2006.01)

(52) U.S. Cl.
USPC ............... 349/149; 349/58; 349/60; 349/150

(58) Field of Classification Search
USPC ..................... 349/58–60, 149–152
See application file for complete search history.

(56) References Cited

U.S. PATENT DOCUMENTS

| 5,990,989 | A * | 11/1999 | Ozawa | 349/61 |
| 7,719,857 | B2 | 5/2010 | Ogawa | |
| 2002/0180917 | A1 | 12/2002 | Jang | |
| 2004/0257515 | A1 * | 12/2004 | Lee | 349/150 |

FOREIGN PATENT DOCUMENTS

| CN | 101031191 A | 9/2007 |
| JP | 2004177797 | 6/2004 |
| KR | 20070109471 A | 11/2007 |
| TW | 200833222 A | 8/2008 |

OTHER PUBLICATIONS

English translation of abstract and pertinent parts of KR 20070109471 A.
English translation of abstract and pertinent parts of CN 101031191 A.
English language translation of abstract of JP 2004-177797 (published Jun. 24, 2004).
English translation of abstract and pertinent parts of TW 200833222 A (published Aug. 1, 2008).

* cited by examiner

*Primary Examiner* — Bumsuk Won
*Assistant Examiner* — Charles Chang
(74) *Attorney, Agent, or Firm* — McClure, Qualey & Rodack, LLP

(57) ABSTRACT

A flat panel display device includes a display panel, a backlight module, a printed circuit board and a protection structure. The backlight module is disposed on a non-display side of the display panel. The printed circuit board with a signal connector is connected with the display panel and disposed between the display panel and the printed circuit board. The protection structure is used to protect the backlight module from the deformation caused by the external force, especially the optically films in it, like conductive film etc. The protection structure includes a protective film, a movable piece and an elastic element. The protective film is covered on the printed circuit board and having an opening to expose the signal connector. The movable piece is connected with the protective film, and the opening is disposed between the movable piece and the protective film.

21 Claims, 5 Drawing Sheets

PROTECTION STRUCTURE

RELATED APPLICATIONS

This application claims priority to Taiwan Application Serial Number 99126960, filed Aug. 12, 2010 which is herein incorporated by reference.

BACKGROUND

1. Field of Invention

The present invention relates to a flat panel display. More particularly, the present invention relates to a protection structure of the flat panel display.

2. Description of Related Art

Compared with the traditional cathode ray tube displays, the liquid crystal displays have the advantages of lightweight, thinner and less radiation. It is obvious that the liquid crystal display is more and more general recently.

The liquid crystal display includes an LCD panel and a backlight module. The LCD panel needs a printed circuit board with a plurality of electrical elements and a signal connector disposed on the LCD panel, which acts on providing the transmission of the driving signal. The backlight module is to provide the light for the LCD panel. Generally, the printed circuit board will be located on the backside of the backlight module during assembling the liquid crystal display. But for the demand of a thinner display structure, the space between the printed circuit board and the casing of the display is getting smaller and smaller. Under this condition, the electrical elements of the printed circuit board are easily damaged because of short-circuit or collision. Therefore, an insulating layer is usually added between the printed circuit board and the casing of the liquid crystal display during fabrication to avoid short-circuit and to reduce the damage from the collision.

Furthermore, the manufacturer and the customers will do the pressure test for the display panels by sampling from different batches to make sure the quality stability. The pressure tests usually impose on the position between the flat cable and the connector. This kind of pressure can't ease off only by using an insulating layer as a buffer, and the optical films become easier to be out of shape under pressure. So it is worthy of thinking and solving the problem of reducing the pressure of the optical films from the pressure test and reducing the failure rate of the product.

SUMMARY

The present invention is directed to a protection structure, which satisfies this need for preventing the deformation of the backlight module, especially the optical films in it.

It is therefore an objective of the present invention to provide a flat panel display device. The flat panel display device comprises a display panel, a backlight module, a printed circuit board and a protection structure. The backlight module is disposed on a non-display side of the display panel. The printed circuit board with a signal connector is connected with the display panel and disposed between the display panel and the printed circuit board. The protection structure is used to protect the backlight module from the deformation caused by the external force, especially the optically films and the LGP in it, such as light guide plate etc. The protection structure includes a protective film, a movable piece and an elastic element. The protective film is covered on the printed circuit board and having an opening to expose the signal connector. The movable piece is connected with the protective film, and the opening is disposed between the movable piece and the protective film. The elastic element is disposed at one side of the movable piece.

It is therefore another objective of the present invention to provide a protection structure of the flat panel display device, which is used to protect a backlight module. The flat panel display device having a printed circuit board with a signal connector. The protection structure includes a protective film, a movable piece and an elastic element. The protective film is covered on the printed circuit board and having an opening to expose the signal connector. The movable piece is connected with the protective film, and the opening is disposed between the movable piece and the protective film. The elastic element is disposed at one side of the movable piece, so that the device of the elastic element and the movable piece can reduces the damage of the backlight module caused by the external force.

According to another embodiment of the invention, the flat panel display device further comprises a front bezel disposed on a display side of the display panel.

According to another embodiment of the invention, the protection structure comprises an edge attached to the front bezel.

According to another embodiment of the invention, the signal connector has an opening facing along a direction that is substantially perpendicular to a long axis of the printed circuit board.

According to another embodiment of the invention, an area of the opening of the protective film is bigger than an exposed area of the signal connector.

According to another embodiment of the invention, the movable piece has at least one connecting band to be connected with the protective film.

According to another embodiment of the invention, the movable piece has a handle, the opening and the handle are disposed at two opposite side of the movable piece, respectively.

According to another embodiment of the invention, the protective film is made of one of electrically-insulating materials.

According to another embodiment of the invention, the protective film comprises an electrically-insulating layer and an electrically-conductive layer, and the insulating layer is in contact with the printed circuit board.

According to another embodiment of the invention, the elastic element has substantially the same area as the movable piece has.

According to another embodiment of the invention, the elastic element is made of a sponge or one of flexible complex materials.

According to another embodiment of the invention, the elastic element comprises an adhesive layer.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
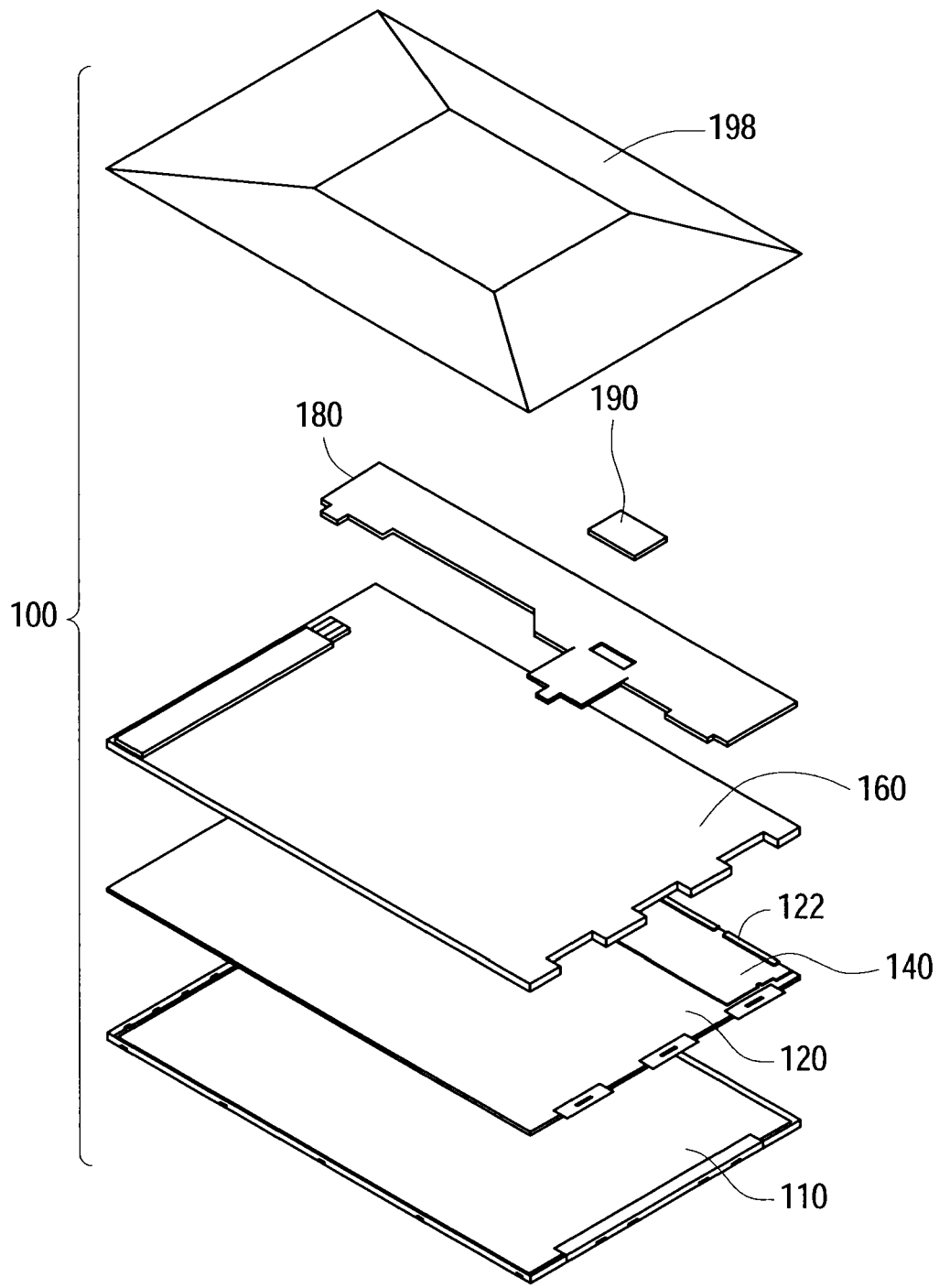
FIG. 1 illustrates an exploded view of a flat panel display according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

One aspect of the present invention is directed to a protection structure. The protection structure can decreases the pressure of the backlight module from the pressure tests and reduces the failure rate of the products.

FIG. 1 illustrates an exploded view of a flat panel display according to an embodiment of the present invention. In FIG. 1, the flat panel display 100 includes a front bezel 110, a display panel 120, a printed circuit board 140, a backlight module 160, a protection structure 180 and a casing 198.

In this embodiment, the front bezel 110 is disposed on a display side of the display panel 120. The printed circuit board 140 is connected with the display panel 120 by the COF (Chip on film) 122, but it's not limited thereto. An FPC (Flex Printed Circuit) also could be used to connect the printed circuit board 140 and the display panel 120. When the backlight module 160 is disposed between the display panel 120 and the casing 198, the printed circuit board 140 connected with the display panel 120 would be turned over and located between the backlight module 160 and the casing 198. The protection structure 180 is covered on the printed circuit board 140, so as to prevent the backlight module 160 from the stress concentration and deformation caused by the external force, especially the optical elements in backlight module 160, such as light guide plate etc.

Figure 2:
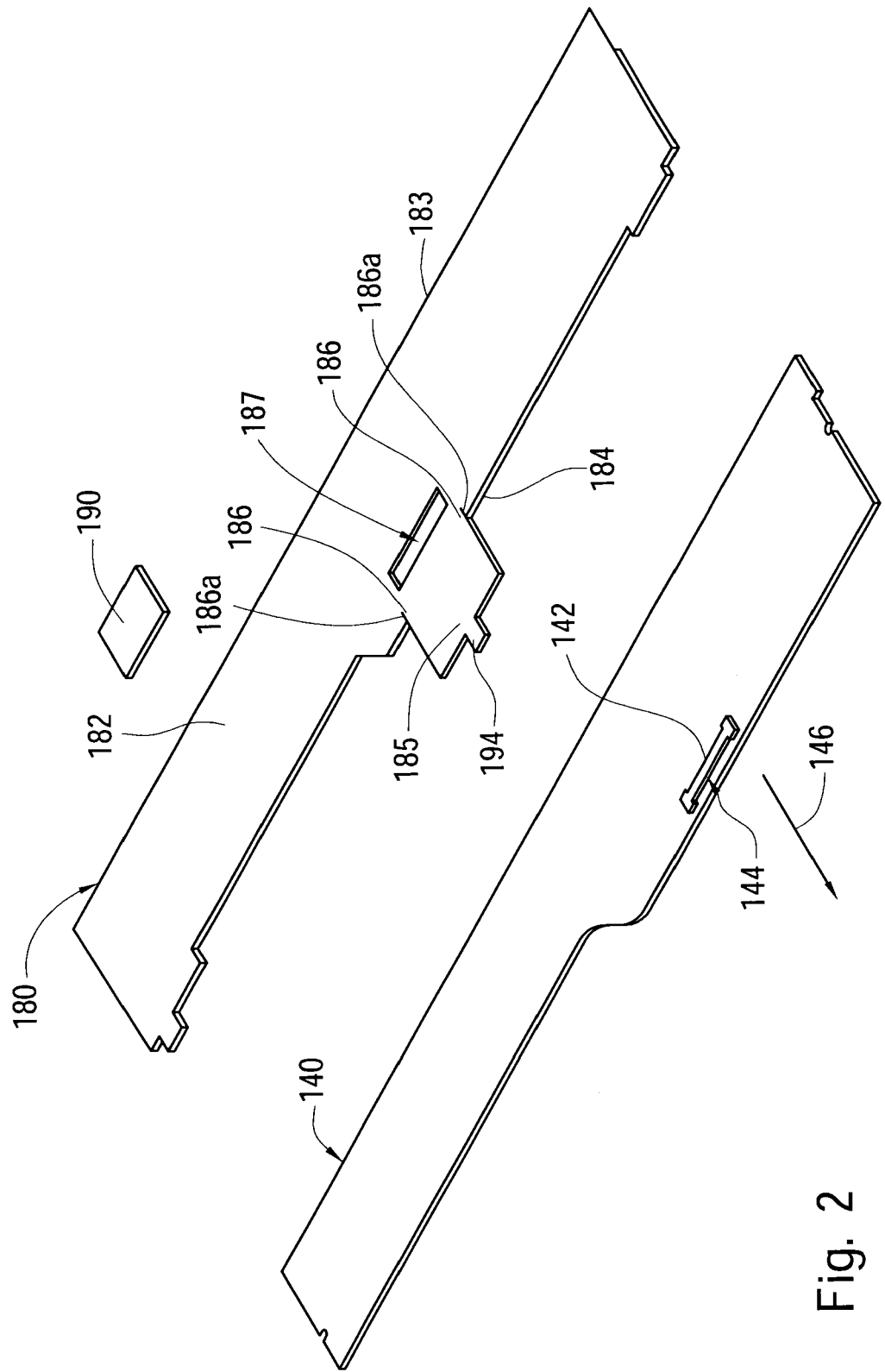
FIG. 2 illustrates the printed circuit board and the protection structure of FIG. 1.

FIG. 2 illustrates the printed circuit board and the protection structure of FIG. 1. In FIG. 2, the printed circuit board 140 includes a signal connector 142 with an opening 144. The opening 144 of the signal connector 142 faces along a direction 146 that is substantially perpendicular to a long axis of the printed circuit board 140. The protection structure 180 includes a protective film 182, a movable piece 185 and an elastic element 190. A first edge 183 of the protective film 182 is attached to the front bezel 110, and a second edge 184 has two connecting bands 186 extending from the protective film 182. Two cut lines 186a are also formed adjacent to two connecting bands 186, respectively. The movable piece 185 is connected with the protective film 182 by the connecting bands 186. An opening 187 is formed among two connecting bands 186, the protective film 182 and the movable piece 185, and its area is slightly bigger than that of the signal connector 142, thereby exposing the signal connector 142 of the printed circuit board 140 and containing the signal connector 142 therein. Therefore, the total thickness of the protection structure 180 will not be increased overly after adding the protective film 182. When the movable piece 185 is lifted, the opening 187 will be raised at the same time because of the cut lines 186a between the connecting bands 186 and the protective film 182, and it will fully expose the signal connector 142, i.e. exposing the opening 144 of the connector 142, to make it easy to connect with other components, e.g. a cable connector. With the design of the opening 187 for exposing the signal connector 142, the total thickness of the signal connector 142 and the protection structure 180 will not be increased when the thickness of the protective film 182 is smaller than that of the signal connector 142. Even if the thickness of the protective film 182 is bigger than that of the signal connector 142, the total thickness of the signal connector 142 and the protection structure 180 will not be increased too much. In this embodiment, the elastic element 190 is attached on the movable piece 185, and its area is substantially the same or smaller than the movable piece 185. The elastic element 190 can also be attached under the movable piece 185. No matter the elastic element 190 is disposed above or under the movable piece 185, it makes no difference to the function of the elastic element 190. In addition, while the elastic element 190 provides sufficient cushioning effect, it is not necessarily for the elastic element 190 to have the same area as the movable piece 185. Furthermore, the total thickness of the elastic element 190 and the movable piece 185 are slightly higher than that of the signal connector 142, so that it can be a pressure absorbing or stress buffering device and reduces the accumulated stress effect of the elements of the printed circuit board 140 while the casing 198 is under the external stress, and it can decreases the failure rate of the backlight module 160.

Figure 3:
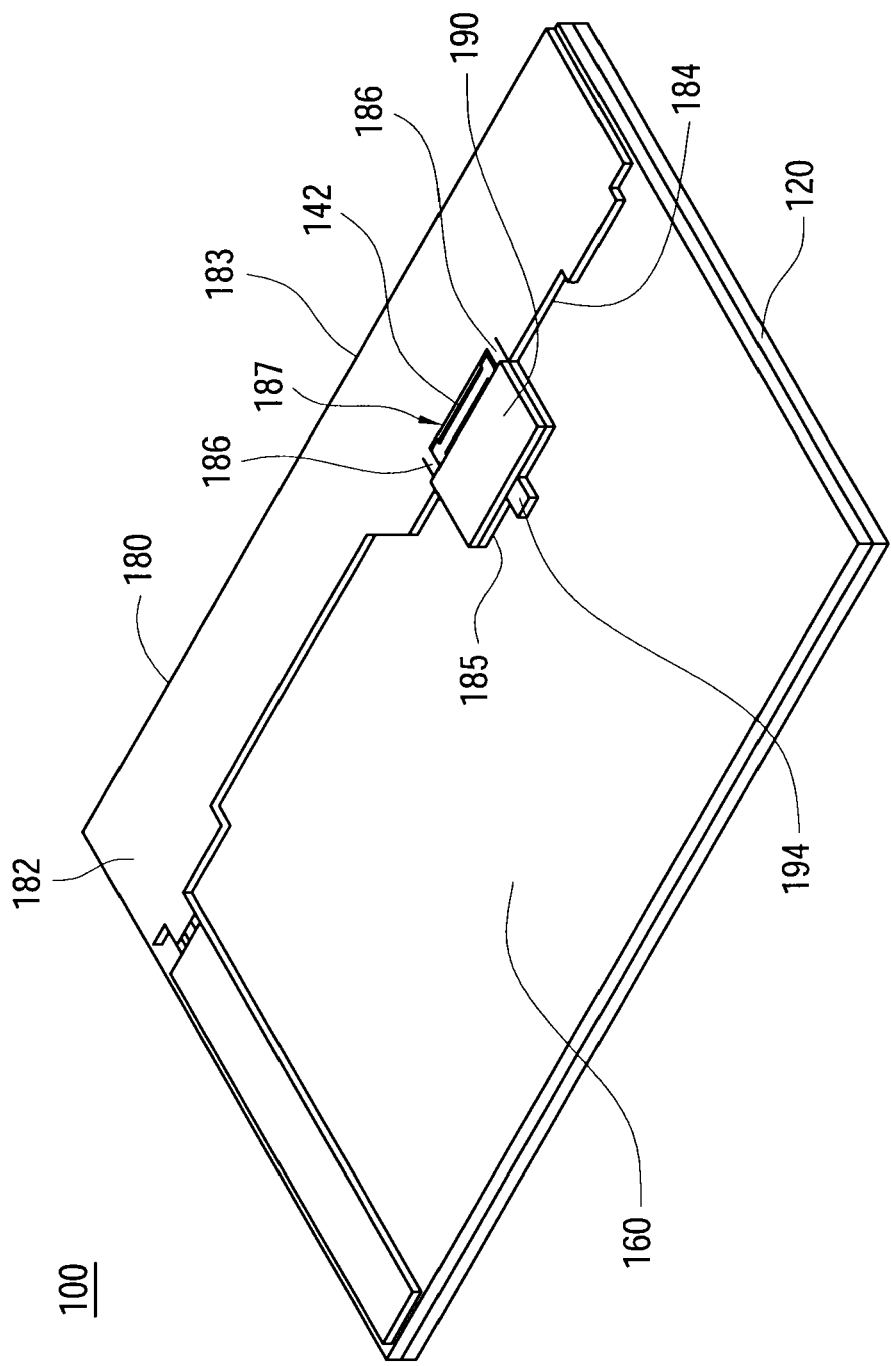
FIG. 3 illustrates an assembled flat panel display.

FIG. 3 illustrates an assembled flat panel display. This figure shows that the protection structure, the printed circuit board, the backlight module and the display panel are assembled (the casing 198 is removed). When all parts of the flat panel display 100 are assembled, the backlight module 160 is disposed between the display panel 120 and the casing 198 (see FIG. 1), and the printed circuit board 140 is sandwiched between the backlight module 160 and the casing 198 (see FIG. 1). The protection structure 180 is covered on the printed circuit board 140, and the signal connector 142 will be contained within the opening 187 and exposed therefrom. The elastic element 190 is disposed on one side of the movable piece 185 to serve as a stress buffer, it also could be disposed between the movable piece 185 and the backlight module 160, and both of these positions make the same effect. The movable piece 185 has a handle 194, and the opening 187 and the handle 194 are located at two opposite sides of the movable piece 185, respectively. The signal connector 142 can be easily connected with other components while pulling the handle 194 and lifting up the movable piece 185 to fully expose the signal connector 142.

Figure 4:
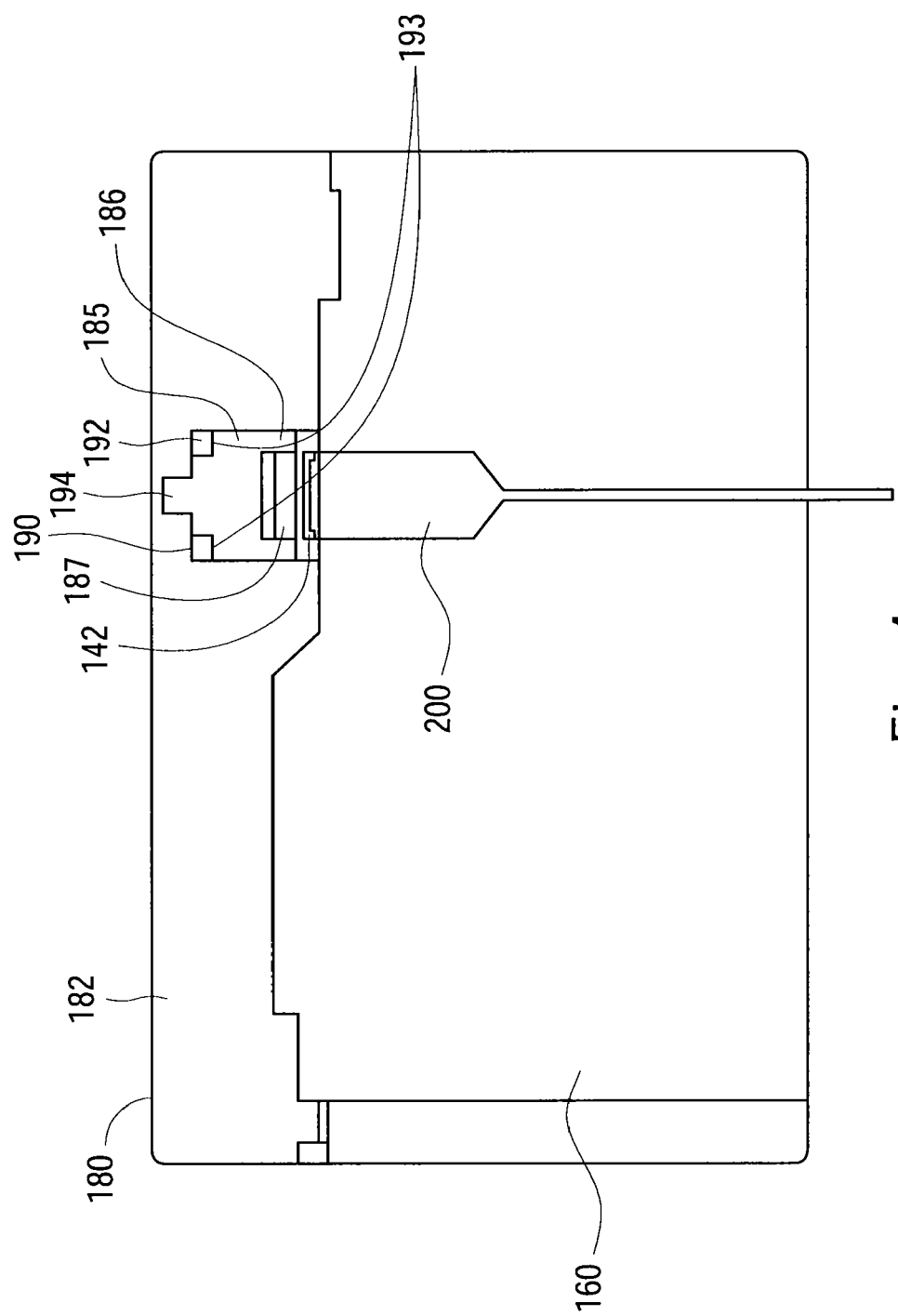
FIG. 4 illustrates the assembled flat panel display in FIG. 3 with a cable connector engaging the signal connector.

FIG. 4 illustrates the assembled flat panel display in FIG. 3 with a cable connector engaging the signal connector. It shows that the movable piece 185 be folded against the protective film 182, thereby exposing the signal connector 142 of the printed circuit board 140, and the cable connector 200 is placed into the signal connector 142. In this embodiment, each of two corners of the movable piece 185 has a cutout 193. When the elastic element 190 is disposed on the movable piece 185, the adhesive layer 192 of the elastic element 190 is exposed by the cutouts 193 of the movable piece 185, so that the movable piece 185 can be secured to the backlight module 160 or the cable connector 200 by means of the adhesive layer 192. When the cable connector 200 is placed into the signal connector 142, the elastic element 190 can also be disposed between the movable piece 185 and the backlight module 160, because both positions of the elastic element 190 can achieve the same cushioning effect. If the cable connector 200 is placed between the movable piece 185 and the backlight module 160, the movable piece 185 will be lifted up when pulling the handle 194. After the cable connector 200 is connected to the signal connector 142, the movable piece 185 will be covered on the cable connector 200 by pulling down the handle 194. In this case, the elastic element 190 can be the stress absorbing device of the cable connector 200, and the adhesive layer 192 of the elastic element 190 can be used to fasten the movable piece 185. When the cable connector 200 needs to be removed, the movable piece 185 also needs to be lifted up.

In these embodiments, the protective film 182, the movable piece 185 and the handle 194 is made of one of electrically-insulating materials, and the elastic element 190 is made of a sponge or one of flexible composite materials.

Figure 5:
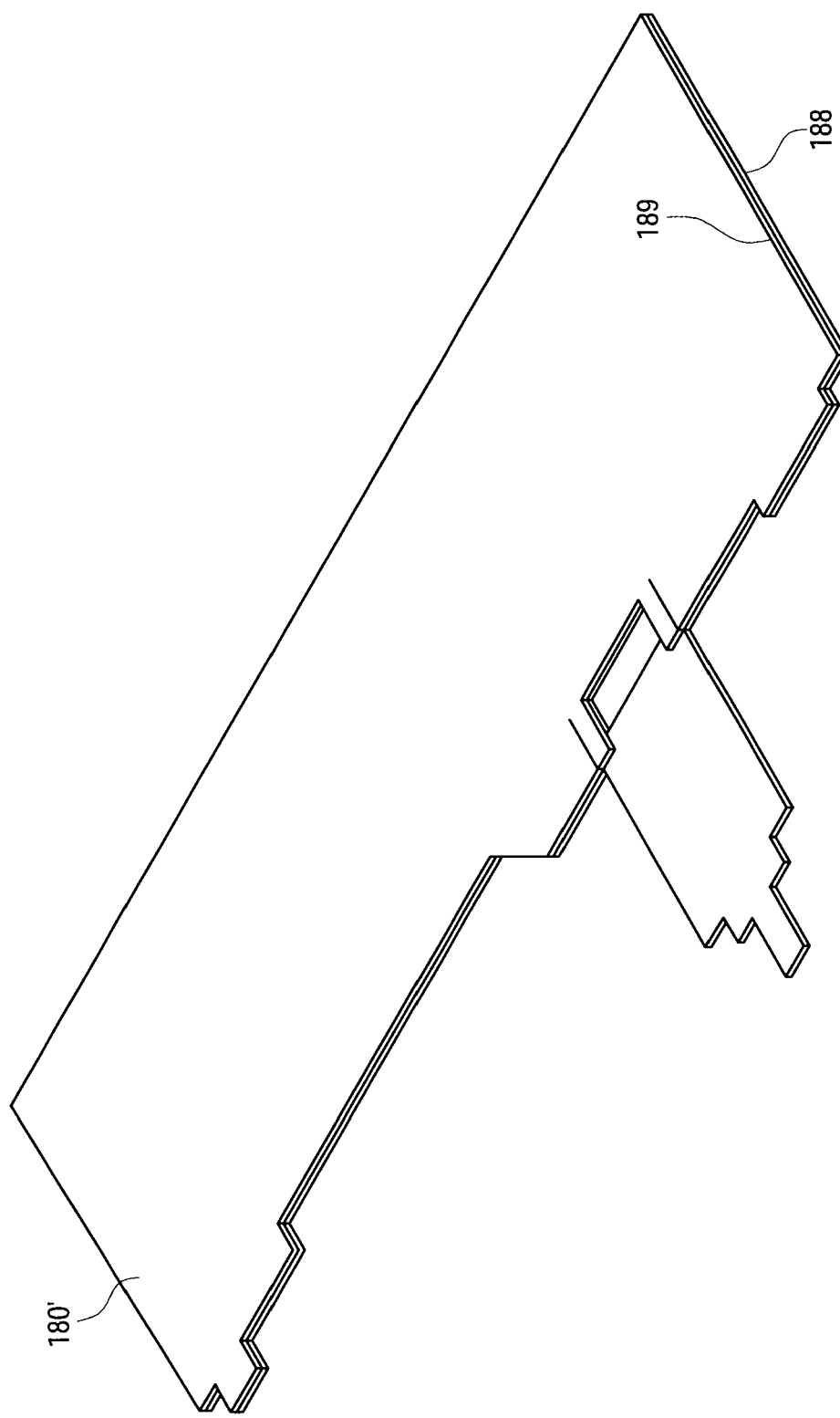
FIG. 5 illustrates another embodiment of the protection structure of this invention.

FIG. 5 illustrates another embodiment of the protection structure of this invention. In this embodiment, the protection structure 180' includes an electrically-insulating layer 188 and an electrically-conductive layer 189. The electrically-insulating layer 188 is in contact with the printed circuit board 140, as so to prevent short-circuit of the printed circuit board 140. The electrically-conductive layer 189 is disposed between the electrically-insulating layer 188 and the casing 198, which could prevent the electromagnetism when it is grounded.

According to discussed embodiments herein, the protection structure mentioned is equipped with a protective film with a movable piece, which has an additional elastic element to protect the backlight module, especially the optical elements in it. This invention increases the protection and reliability for the backlight module of an LCD display more than other conventional protective films on the printed circuit board.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat panel display device, comprising:
a display panel;
a backlight module disposed on a non-display side of the display panel;
a printed circuit board connected with the display panel and having a signal connector, and the signal connector having an opening, wherein the backlight module is disposed between the display panel and the printed circuit board; and
a protection structure comprising:
a protective film covering the printed circuit board and having a through hole to expose the signal connector;
a movable piece connected with the protective film, wherein the through hole is disposed between the movable piece and the protective film, and the opening of the signal connector is exposed when the movable piece is lifted; and
an elastic element disposed at one side of the movable piece.

2. The flat panel display device as claimed in claim 1, further comprising a front bezel disposed on a display side of the display panel.

3. The flat panel display device as claimed in claim 2, wherein the protection structure comprises an edge attached to the front bezel.

4. The flat panel display device as claimed in claim 1, wherein the opening of the signal connector faces along a direction that is substantially perpendicular to a long axis of the printed circuit board.

5. The flat panel display device as claimed in claim 1, wherein an area of the through hole of the protective film is bigger than an exposed area of the signal connector.

6. The flat panel display device as claimed in claim 1, wherein the movable piece has at least one connecting band to be connected with the protective film.

7. The flat panel display device as claimed in claim 1, wherein the movable piece has a handle, the through hole and the handle are disposed at two opposite sides of the movable piece, respectively.

8. The flat panel display device as claimed in claim 1, wherein the protective film is made of one of electrically-insulating materials.

9. The flat panel display device as claimed in claim 1, wherein the protective film comprises an electrically-insulating layer and an electrically-conductive layer, and the electrically-insulating layer is in contact with the printed circuit board.

10. The flat panel display device as claimed in claim 1, wherein the elastic element has substantially the same area as the movable piece has.

11. The flat panel display device as claimed in claim 1, wherein the elastic element is made of a sponge or one of flexible composite materials.

12. The flat panel display device as claimed in claim 1, wherein the elastic element comprises an adhesive layer.

13. A protection structure for protecting a backlight module of a display device, the display device having a printed circuit board equipped with a signal connector, the signal connector having an opening, the protection structure comprising:
a protective film for covering the printed circuit board and having a through hole to expose the signal connector;
a movable piece connected with the protective film, and the through hole is disposed between the movable piece and the protective film, and the opening of the signal connector is exposed when the movable piece is lifted; and
an elastic element disposed at one side of the movable piece.

14. The protection structure as claimed in claim 13, wherein an area of the through hole of the protective film is bigger than an exposed area of the signal connector.

15. The protection structure as claimed in claim 13, wherein the movable piece has at least one connecting band to be connected with the protective film.

16. The protection structure as claimed in claim 13, wherein the movable piece has a handle, the through hole and the handle are disposed at two opposite sides of the movable piece, respectively.

17. The protection structure as claimed in claim 13, wherein the protective film is made of one of electrically-insulating materials.

18. The protection structure as claimed in claim 13, wherein the protective film comprises an electrically-insulating layer and an electrically-conductive layer, and the electrically-insulating layer is in contact with the printed circuit board.

19. The protection structure as claimed in claim 13, wherein the elastic element has substantially the same area as the movable piece has.

20. The protection structure as claimed in claim 13, wherein the elastic element is made of a sponge or one of flexible composite materials.

21. The protection structure as claimed in claim 13, wherein the elastic element comprises an adhesive layer.

* * * * *